3,326,198
SMOG REDUCTION FILTER FOR INTERNAL
COMBUSTION ENGINES
Connie L. Jackson, 13429 Highway 80, El Cajon, Calif.
92021, and Sue Ann Medearis, 4562 33rd St., San
Diego, Calif. 92116
Filed Mar. 19, 1965, Ser. No. 441,136
4 Claims. (Cl. 123—119)

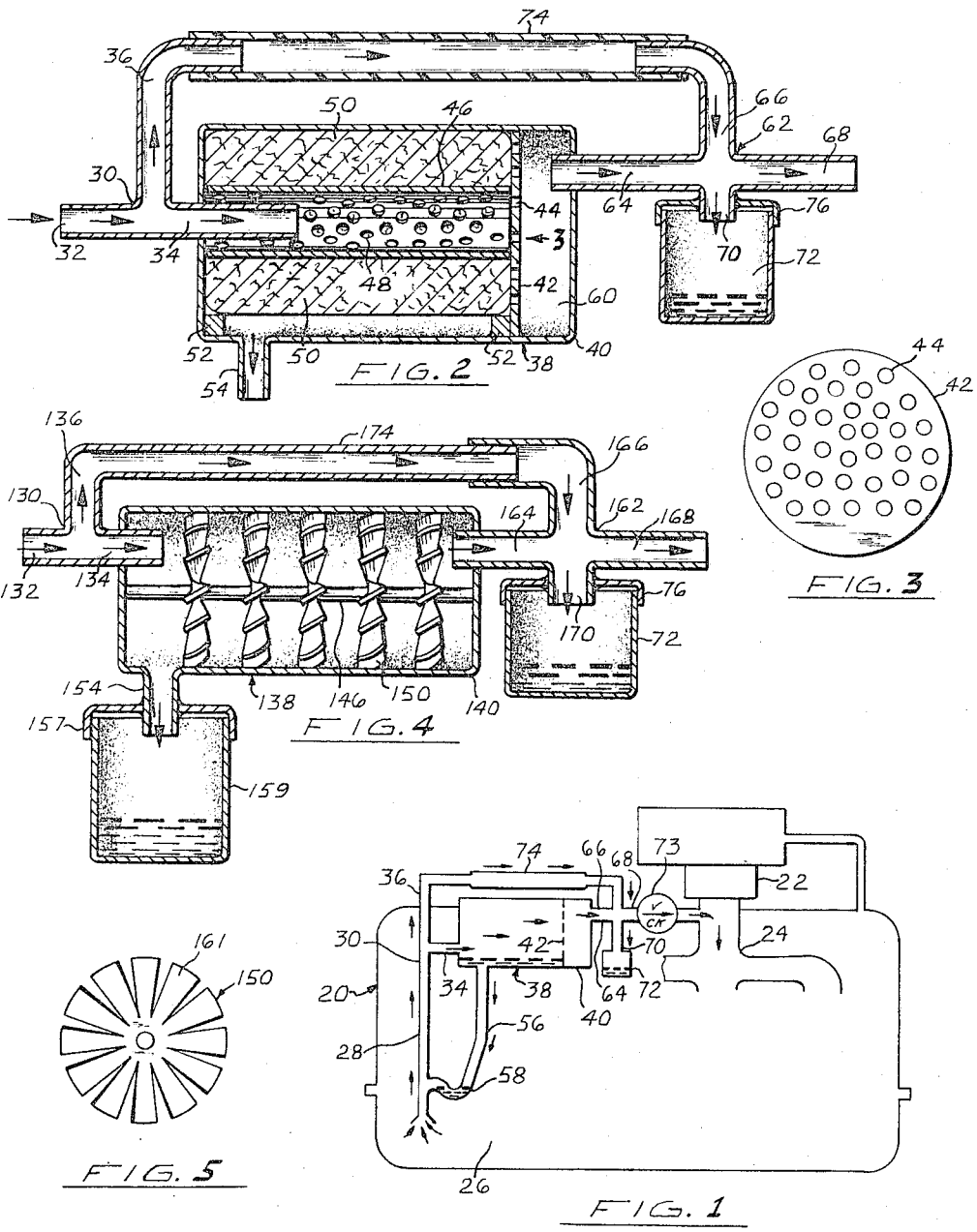

ABSTRACT OF THE DISCLOSURE

An internal combustion engine having a fuel intake and a crank case, the crank case being connected with the fuel intake by parallel passages one of which contains a filter. A well for liquid is connected with the outlets of the two parallel passages.

The present invention relates to an internal combustion engine and more particularly to dissipating obnoxious fumes present in the crankcase of the engine. Such engines are provided with a fuel intake passage in the form of a manifold, in multi-cylinder engines, and are provided with a crankcase. It has been the practice of connecting the crankcase and fuel intake.

In practicing the present invention, a filter is disposed in the passage between the crankcase and the fuel intake, but in addition there is provided a by-pass above and in parallel relationship with the filter. The filter filters the liquid from the mixture leaving the crankcase, the separate gas passing to the fuel intake. The separated liquid, in one embodiment of the invention, is collected in a removable container, and, in another embodiment, the liquid is returned to the crankcase. The by-pass provides for the ready passage of the free gas leaving the crankcase and the gas which is separated from the mixture while enroute in the passage leading from the crankcase to the fuel intake.

The present invention also includes a trap interposed between the outlets of the by-pass and the filter and the fuel intake for entrapping all condensates and acids emanating from the outlets.

Other features and the advantages of the present invention will be apparent from the following description, reference being had to the accompanying drawings where preferred embodiments of the invention are illustrated.

In the drawings:

FIG. 1 is a schematic view of an internal combustion engine showing the improvement attached thereto;

FIG. 2 is a cross-sectional view of the filter and the by-pass together with the cross-sectional view of the trap showing one form of the invention;

FIG. 3 is an elevational view of the end plate of the filter looking in the direction of arrow 3 of FIG. 2;

FIG. 4 is a view similar to FIG. 2 but showing a different form of filter and also showing a well for collecting liquid which has been filtered by the filter; and FIG. 5 is an end view showing one of the baffles in the filter shown in FIG. 4.

Referring more in detail to the drawings, the internal combustion engine is shown at 20 in FIG. 1, in diagrammatic form. The carburetor is shown at 22 and the intake manifold at 24. The crank case is shown at 26.

Means is provided forming a passage connecting the crank case 26 with the fuel inlet or manifold 24. This passage includes a tube 28 connected with the crankcase and which is connected to a fitting 30. This fitting is provided with an inlet section 32 and two outlets 34 and 36. The outlet section 34 is connected with a filter 38. The filter 38 includes a casing 40 having a perforated partition 42 therein, the perforations being shown at 44. The casing houses a central core 46 having perforations, the perforations being indicated at 48. The perforated core carries the filtering material 50 which may be in the form of paper or other filter material. Spacers 52 below the filtering material 50 space the material 50 from the bottom of the casing 40. The bottom of the casing 40 is provided with a liquid drain outlet 54 which is connected by a tube 56 and well 58 and the tube 28. The vertical wall 42 is spaced from the outlet end of the casing 40 to provide a separating chamber 60.

As seen in the drawing, the right side of the filter 38 is connected with a fitting 62 having two inlet sections 64 and 66 and two outlet sections 68 and 70. The outlet section 68 is connected through a check valve 73 to the fuel intake or manifold 24. The outlet section 70 is connected with a removable well or container 72.

The outlet section 36 of the fitting 30 is connected by a tube 74 with the inlet section 66 of the fitting 62. This outlet section 36, the tube 74 and the upper part of fitting 66 provides a by-pass above the filter 38.

The fluid emanating from the crankcase 26 into tube 28 comprises a mixture of gas and entrained liquid, the liquid being in substantially vapor form. The mixture passes through the fitting 30 and into the filter 38 where the liquid is filtered and drops to the bottom of the casing 40 and then is conducted through the outlet 54, tube 56, well 58 and lower part of tube 28 into the crankcase 26. The gases pass from the chamber 60 through the fitting 64 and check valve 73 to the intake manifold 24. Some of the gases, being lighter than the liquid, including that which is distilled in the tube 28 as it is being moved upwardly, flows through the by-pass and into fitting 62, whence it flows through the check valve 73 to the intake manifold 24. Such vapors that are distilled in the by-pass and such vapors that pass out of the filter 38 can fall into the well 72 through the fitting 70. It has been found in actual practice that these liquids are in the form of an acid. The well 72 is removably fitted to the cap 76 which cap is preferably welded to the outlet section 70. This well should be emptied periodically.

Referring now to the aspect of the invention shown in FIGS. 4 and 5, a fitting 130 similar to fitting 30 is provided with an inlet section 132 and two outlet sections 134 and 136. This outlet section 134 is connected to the casing 140 of the filter 138. The by-pass tube 174 is formed integrally with the outlet section 136 and it is connected with a fitting 162 having an inlet section 164 and an inlet section 166 connected with the tube 174 and two outlet sections 168 and 170. The outlet section 168 is connected to the check valve 73 and the outlet section 170 is connected to a well or container 72.

In this aspect of the invention, the bottom of the casing 140 is provided with an outlet section 154 which carries a cap 157 which in turn carries a removable container or well 159. This container is adapted to receive the liquid which is separated within the filter 138. This well should be emptied periodically.

The filter material within the filter 138 in the aspect of the invention shown in FIG. 4, comprises a plurality of baffles 150 which are supported by a core or rod 146. Each of these baffles includes a plurality of radially extending blades 161.

It has been found that when applying the present invention to automobile type of internal combustion engines, which could not be maintained operative when provided with a tube connecting the crankcase with the intake manifold through the usual check valve similar to check valve 73, such engines operated highly successfully when equipped with the filters and by-passes as shown herein.

It has been observed under certain conditions, without the gooseneck type of well 58, there will be a tendency, at times, to blow vapor upwardly through the tube 56. However, with the well 58, a quantity of liquid is maintained therein and forms a liquid trap which prevents the gases from flowing upwardly through the drain tube 56.

While the forms of embodiment herein shown and described constitute preferred forms, it is to be understood that other forms may be adopted falling within the scope of the claims that follow.

We claim:
1. A combination comprising:
   (A) an internal combustion engine having:
      (1) means forming a fuel intake,
      (2) a crank case, said crankcase having:
         (a) a gaseous fluid outlet;
   (B) fluid conducting means forming a passage connecting the fluid outlet of the crankcase with the fuel intake passage;
   (C) a filter in said passage;
   (D) a means forming a fluid by-pass at a higher elevation and in parallel relationship with the filter;
   (E) a well for liquid connected with the outlet of the passage and the fluid by-pass.

2. A combination as defined in claim 1, characterized to include:
   (F) a drain duct connecting the first mentioned passage with the crankcase.

3. A combination as defined in claim 2, characterized in that the drain duct includes:
   (G) a well for entrapping liquid.

4. A combination as defined in claim 2, characterized in that the drain duct is connected to the first mentioned passage below the filter.

References Cited

UNITED STATES PATENTS

| | | | |
|---|---|---|---|
| 1,735,694 | 11/1929 | Remington | 123—119 |
| 2,642,052 | 6/1953 | Wagner | 123—119 |
| 3,073,293 | 1/1963 | Barker | 123—119 |
| 3,132,473 | 5/1964 | Hass | 55—315 |
| 3,175,546 | 3/1965 | Roper | 123—119 |
| 3,272,192 | 9/1966 | Jensen | 123—119 |

MARK NEWMAN, *Primary Examiner.*

AL LAWRENCE SMITH, *Examiner.*